(12) United States Patent
Kim et al.

(10) Patent No.: US 10,976,610 B2
(45) Date of Patent: Apr. 13, 2021

(54) DISPLAY DEVICE

(71) Applicant: Samsung Display Co., Ltd., Yongin-si (KR)

(72) Inventors: Kang-min Kim, Hwaseong-si (KR); Namheon Kim, Seongnam-si (KR); Taegyun Kim, Seoul (KR); Joohwan Park, Seoul (KR); Jinho Park, Suwon-si (KR); Dongil Son, Seoul (KR); Donghee Lee, Hwaseong-si (KR); Baekhee Lee, Seoul (KR); Kyungtae Chae, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/543,886

(22) Filed: Aug. 19, 2019

(65) Prior Publication Data
US 2020/0133078 A1 Apr. 30, 2020

(30) Foreign Application Priority Data
Oct. 25, 2018 (KR) .......................... 10-2018-0128253

(51) Int. Cl.
*G02F 1/13357* (2006.01)
*G02F 1/1333* (2006.01)

(52) U.S. Cl.
CPC .. *G02F 1/133617* (2013.01); *G02F 1/133308* (2013.01); *G02F 1/133603* (2013.01); *G02F 1/133605* (2013.01); *G02F 1/133606* (2013.01); *G02F 1/133609* (2013.01); *G02F 2001/133331* (2013.01); *G02F 2001/133612* (2013.01)

(58) Field of Classification Search
CPC ......... G02F 1/133617; G02F 1/133308; G02F 1/133603; G02F 1/133605; G02F 1/133606; G02F 1/133609; G02B 6/0026
See application file for complete search history.

(56) References Cited

U.S. PATENT DOCUMENTS

| | | | |
|---|---|---|---|
| 7,213,958 B2 | 5/2007 | Ouderkirk et al. | |
| 8,866,992 B2* | 10/2014 | Kim | G02B 6/0026 349/61 |
| 9,535,282 B1* | 1/2017 | Stuppi | G02F 1/133617 |

(Continued)

FOREIGN PATENT DOCUMENTS

| | | |
|---|---|---|
| JP | 2016-181474 | 10/2016 |
| KR | 10-1778895 | 9/2017 |

OTHER PUBLICATIONS

Extended European Search Report dated Feb. 6, 2020, issued in EP Patent Application No. 19204792.6.

*Primary Examiner* — Matthew J. Peerce
(74) *Attorney, Agent, or Firm* — H.C. Park & Associates, PLC

(57) ABSTRACT

A display device including an optical member, a display panel disposed above the optical member, and a plurality of light emitting units disposed below the optical member and providing a first color light to the optical member. The optical member may include a glass substrate containing an upper surface and a lower surface facing each other in a thickness direction and overlapping the plurality of light emitting units in a plan view, and a quantum dot layer disposed directly on the upper surface or the lower surface and converting the first color light into a second color light and a third color light.

13 Claims, 19 Drawing Sheets

(56) References Cited

U.S. PATENT DOCUMENTS

| | | | |
|---|---|---|---|
| 9,773,955 B2* | 9/2017 | Jeon | G02B 6/0073 |
| 9,810,942 B2 | 11/2017 | You et al. | |
| 10,297,581 B2* | 5/2019 | Steckel | H01L 33/60 |
| 10,495,923 B2* | 12/2019 | Han | G02B 6/0043 |
| 2013/0009180 A1 | 1/2013 | Kim et al. | |
| 2015/0309367 A1* | 10/2015 | Park | G02F 1/133606 |
| | | | 362/97.1 |
| 2016/0003998 A1 | 1/2016 | Benoit et al. | |
| 2016/0223868 A1 | 8/2016 | Ha et al. | |
| 2017/0102579 A1 | 4/2017 | Wang | |
| 2017/0255056 A1 | 9/2017 | Liu | |
| 2019/0196261 A1* | 6/2019 | Chen | G02F 1/133514 |

\* cited by examiner

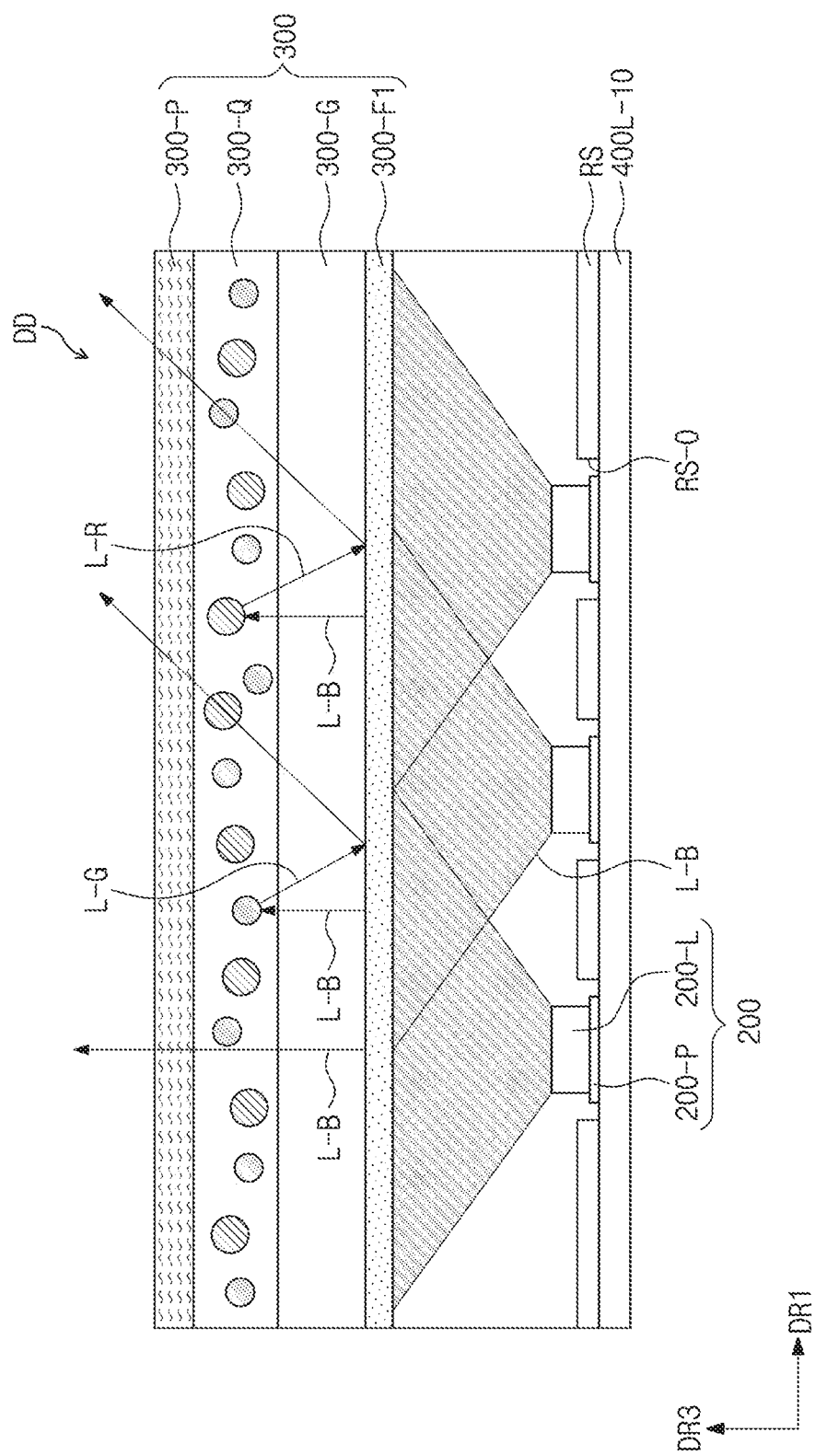

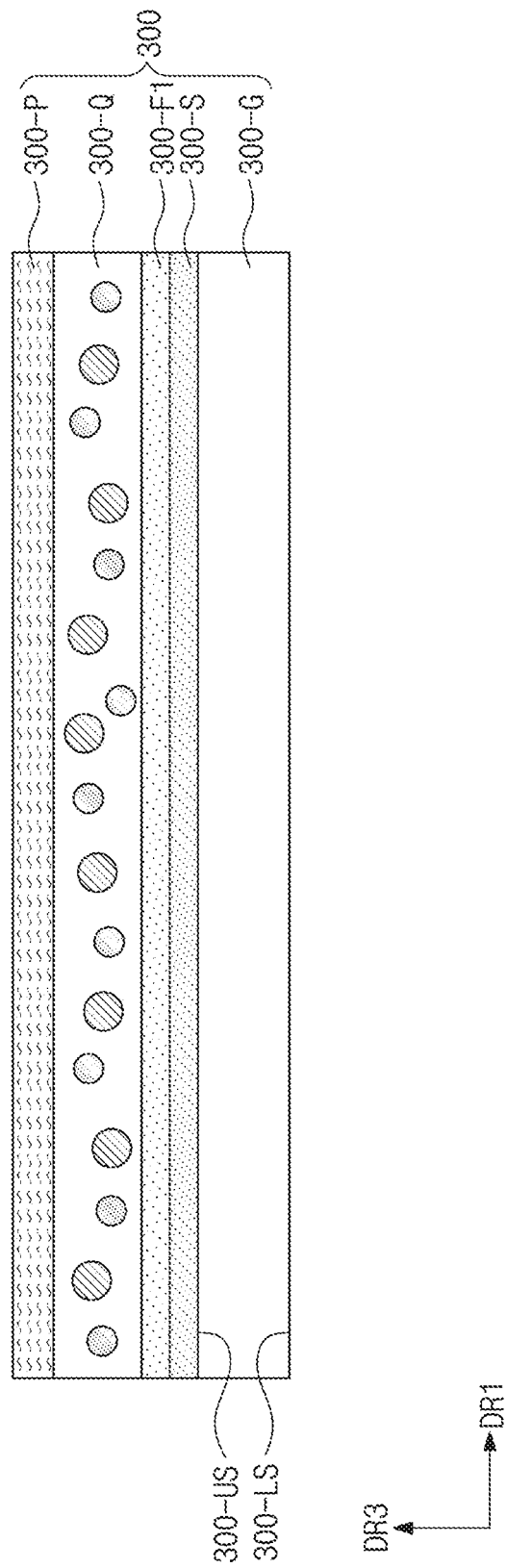

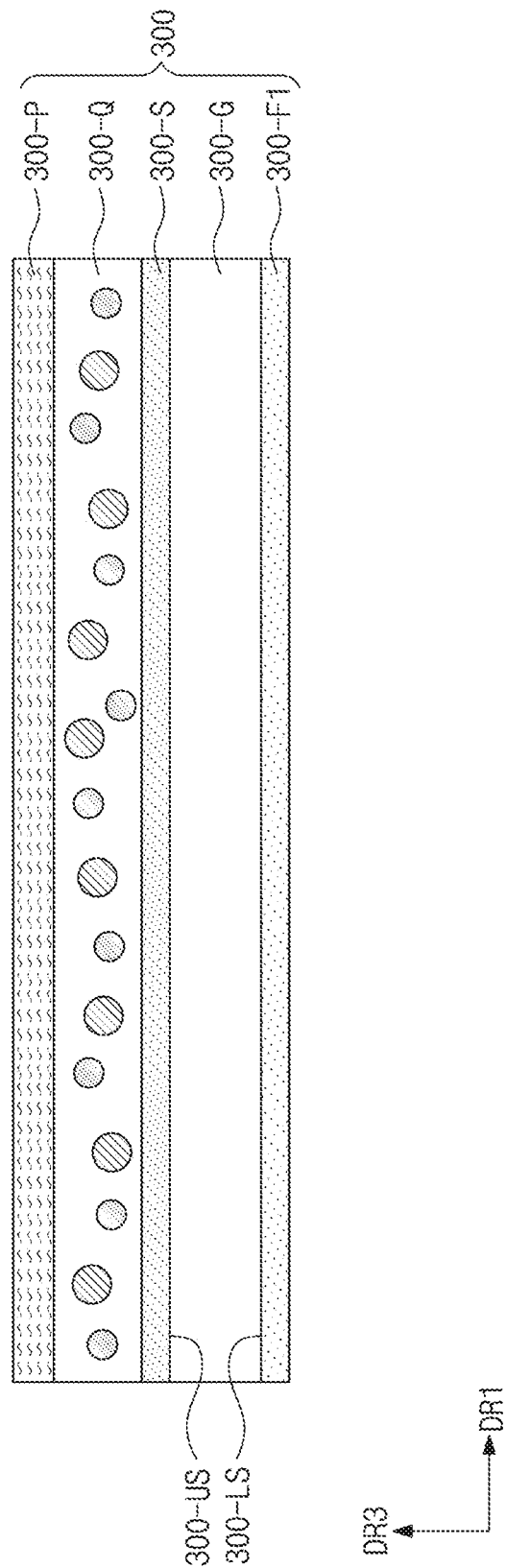

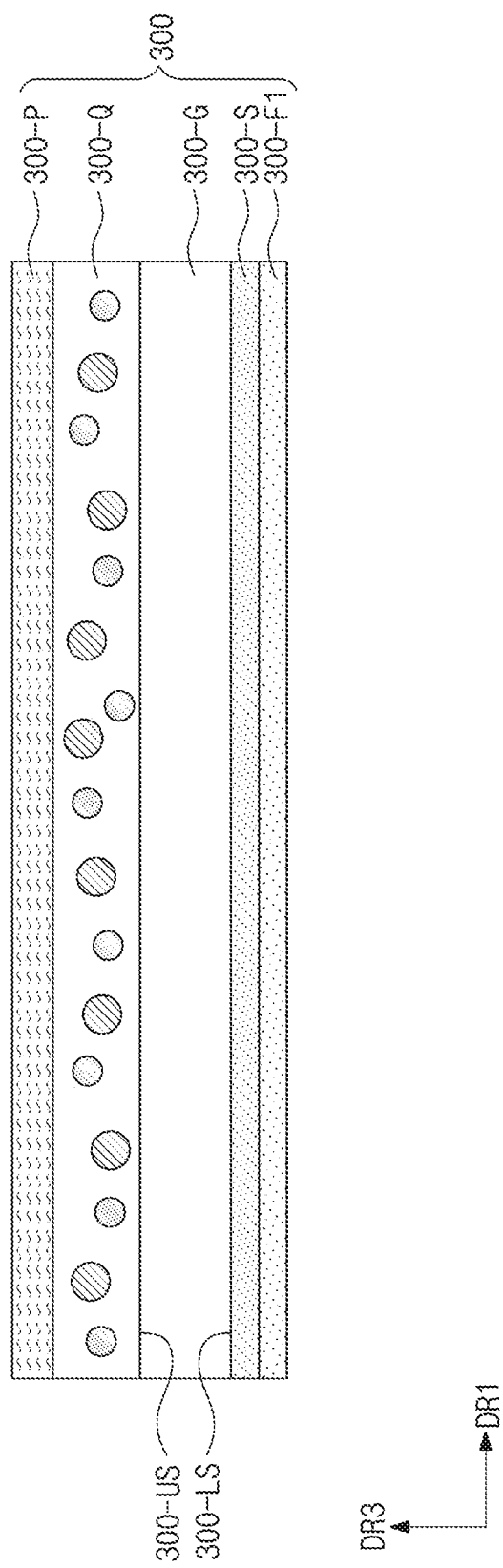

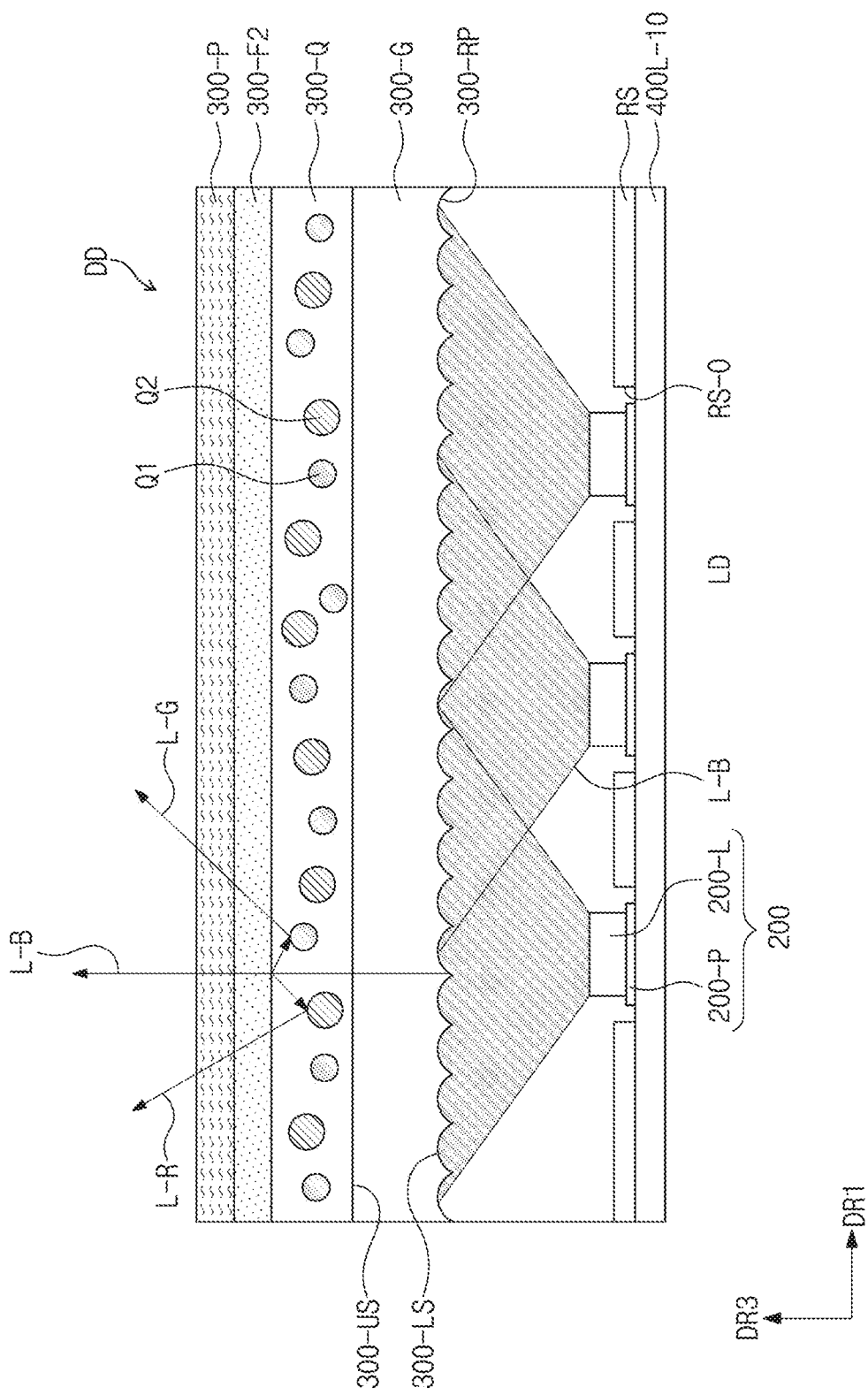

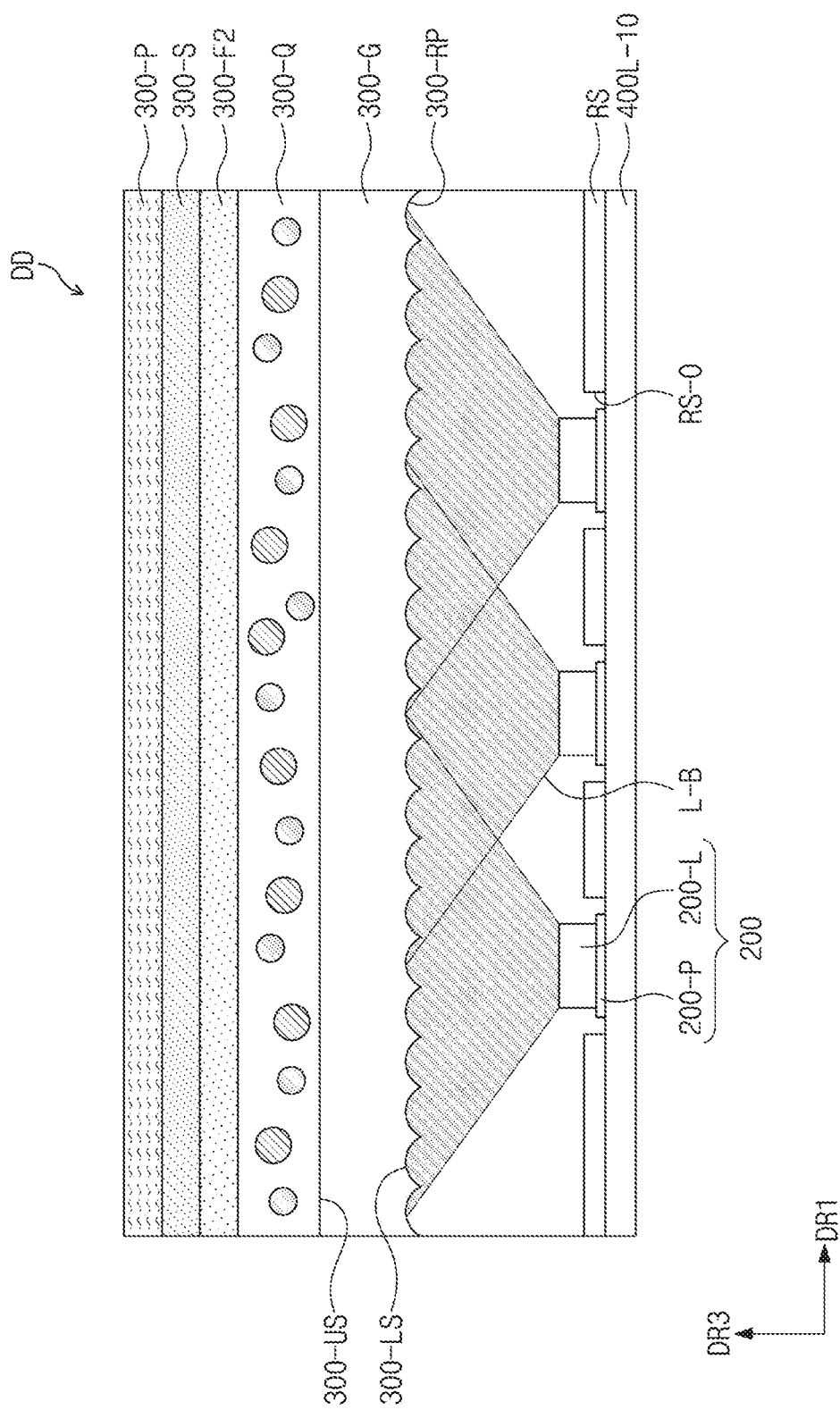

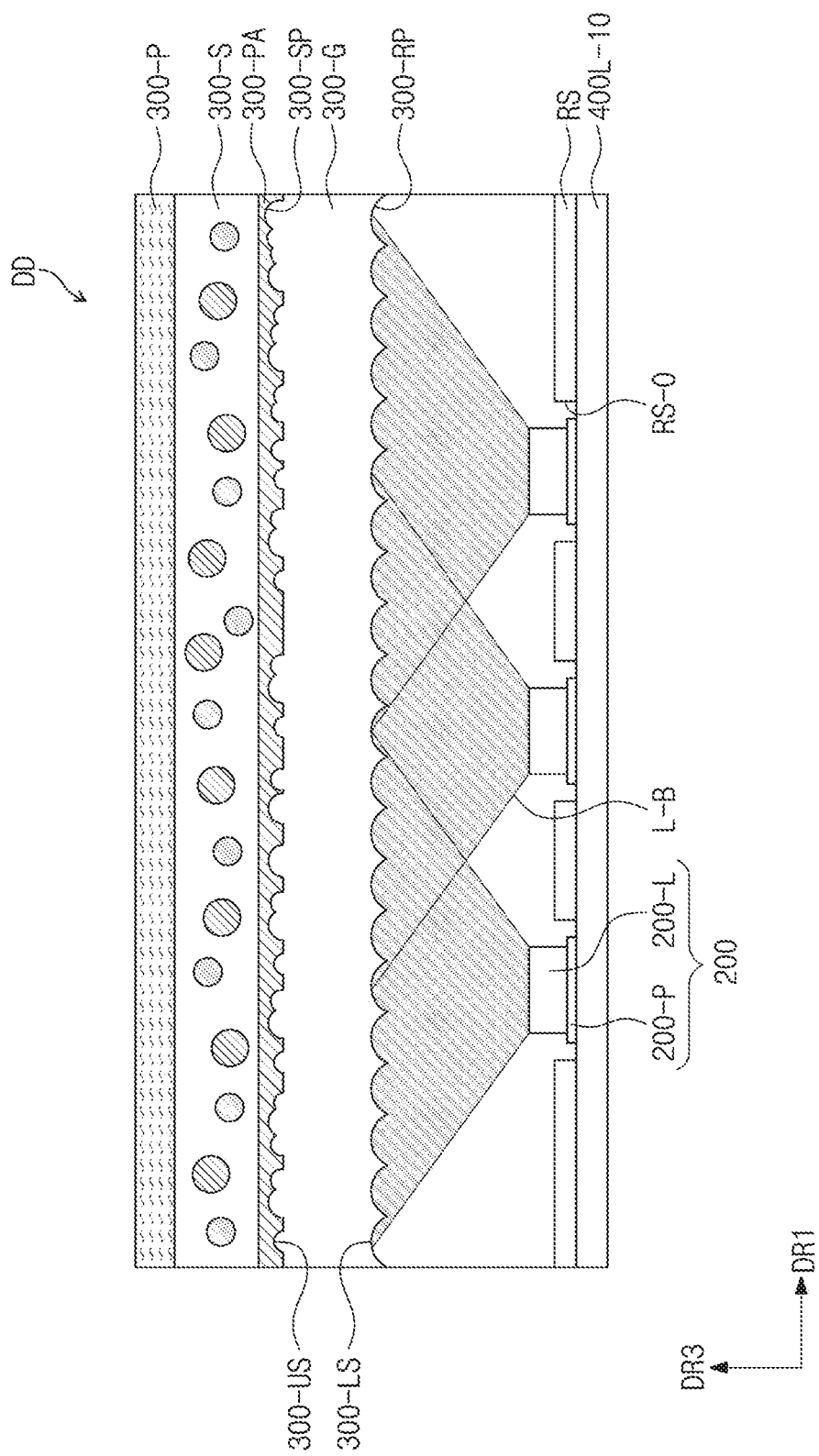

DISPLAY DEVICE

CROSS-REFERENCE TO RELATED APPLICATION

This application claims priority from and the benefit of Korean Patent Application No. 10-2018-0128253, filed on Oct. 25, 2018, which is hereby incorporated by reference for all purposes as if fully set forth herein.

BACKGROUND

Field

Exemplary embodiments of the present invention relate generally to a display device, and more specifically, to a display device with improved display quality.

Discussion of the Background

A non-light emitting display device, such as a liquid crystal display device, generates an image using light provided from a backlight unit. The backlight unit includes a plurality of light emitting units which emit light. Each of the plurality of light emitting units includes a plurality of light emitting elements.

The non-light emitting display device has an optical member for improving characteristics of the light provided from the light emitting units. The optical member is disposed below a display panel.

The above information disclosed in this Background section is only for understanding of the background of the inventive concepts, and, therefore, it may contain information that does not constitute prior art.

SUMMARY

Exemplary embodiments of the present invention provide a display device having a wide color gamut, and high luminance.

Additional features of the inventive concept will be set forth in the description which follows, and in part will be apparent from the description, or may be learned by practice of the inventive concepts.

An exemplary embodiment of the invention provides a display device including: an optical member; a display panel disposed above the optical member; and a plurality of light emitting units disposed below the optical member, and configured to provide a first color light to the optical member. The optical member includes a glass substrate having an upper surface and a lower surface facing each other in a thickness direction, and overlapping the plurality of light emitting units in a plan view; and a quantum dot layer disposed directly on the upper surface or the lower surface, and configured to convert the first color light into a second color light and a third color light.

The first color light may have a wavelength of 410 nm to 480 nm.

Concave patterns may be defined on the lower surface of the glass substrate toward the upper surface of the glass substrate.

Scattering patterns may be defined on the upper surface of the glass substrate.

The display device may further include a passivation layer contacting the scattering patterns of the glass substrate and providing a planar surface.

Each of the plurality of light emitting units may include a circuit substrate and a plurality of light emitting elements mounted on the circuit substrate.

The display device may further include a reflection sheet disposed on the plurality of light emitting units and defining a plurality of openings corresponding to the plurality of light emitting elements, and the reflection sheet may have a blue color.

The plurality of light emitting elements may be independently turned on and off.

The circuit substrate may include a protection layer defining an outer surface, and the protection layer may have a blue color.

The protection member may include a first protection member supporting the plurality of light emitting units and a second protection member coupled to the first protection member. The first protection member may include a bottom portion and a side wall portion, and the circuit substrate having the light emitting units may substantially completely cover the bottom portion.

The display device may further include a scattering layer disposed directly on the upper surface of the glass substrate or the lower surface of the glass substrate, and containing a base resin layer and scattering particles mixed in the base resin layer.

The scattering particles may include $TiO_2$, $SiO_2$, $ZnO$, $Al_2O_3$, $BaSO_4$, $CaCO_3$, or $ZrO_2$.

The scattering particles may have a refractive index of about 2 or more and may have a diameter of about 150 nm to 400 nm.

The display device may further include a first filter disposed directly on one of the upper surface of the glass substrate and the lower surface of the glass substrate that the quantum dot layer is not disposed directly on, and configured to block the second color light and the third color light.

The first filter may include a plurality of first layers and a plurality of second layers alternately disposed with the plurality of first layers. A refractive index of the plurality of first layers may be about 1.4 to 1.6, and a refractive index of the plurality of second layers may be about 1.9 to 2.1. One of the first layers and one of the second layers which are consecutively stacked may be defined as a unit layer, and the first filter may include about 6 to 15 unit layers.

The display device may further include a second filter disposed directly on the upper surface of the glass substrate, and configured to block the first color light.

The second filter may include a plurality of first layers and a plurality of second layers alternately disposed with the plurality of first layers. A refractive index of the plurality of first layers may be about 1.4 to 1.6, and a refractive index of the plurality of second layers may be about 1.9 to 2.1. One of the first layers and one of the second layers which are consecutively layered may be defined as a unit layer, and the second filter may include about 1 to 5 unit layers.

The display device may further include a scattering layer disposed directly on the second filter, and containing a base resin layer and scattering particles mixed in the base resin layer.

Another exemplary embodiment of the present invention provides a display device including an optical member; a display panel disposed above the optical member; and a plurality of light emitting units disposed below the optical member, and configured to provide a first color light to the optical member. The optical member may include a glass substrate having an upper surface and a lower surface facing each other in a thickness direction, and overlapping the plurality of light emitting units in a plan view; a quantum dot layer disposed directly on the upper surface, and configured to generate a second color light and a third color light from the first color light; a short pass filter disposed between the quantum dot layer and the glass substrate, and having a cut-off wavelength of 500 nm to 550 nm; and a scattering layer disposed between the quantum dot layer and the glass substrate, and containing scattering particles.

Another exemplary embodiment of the present invention provides a display device including an optical member; a display panel disposed above the optical member; and a plurality of light emitting units disposed below the optical member, and providing a first color light to the optical member. The optical member may include a glass substrate having an upper surface and a lower surface facing each other in a thickness direction, and overlapping the plurality of light emitting units in a plan view; a quantum dot layer disposed directly on the upper surface or the lower surface, and configured to convert the first color light into a second color light and a third color light; a short pass filter disposed between the quantum dot layer and the glass substrate, and having a cut-off wavelength of 500 nm to 550 nm; and a long pass filter disposed directly on the quantum dot layer, and having a cut-off wavelength of 465 nm to 485 nm.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 5C is a cross-sectional view illustrating a portion of a display device according to an exemplary embodiment.

FIGS. 6A, 6B, 6C, 6D, and 6E are cross-sectional views illustrating a portion of an optical member according to an exemplary embodiment.

FIG. 7A is a cross-sectional view illustrating a portion of a display device according to an embodiment;

FIG. 7D is a cross-sectional view illustrating a portion of a display device according to an exemplary embodiment.

FIG. 8 is a cross-sectional view illustrating a portion of a display device according to an exemplary embodiment.

DETAILED DESCRIPTION

Figure 1:
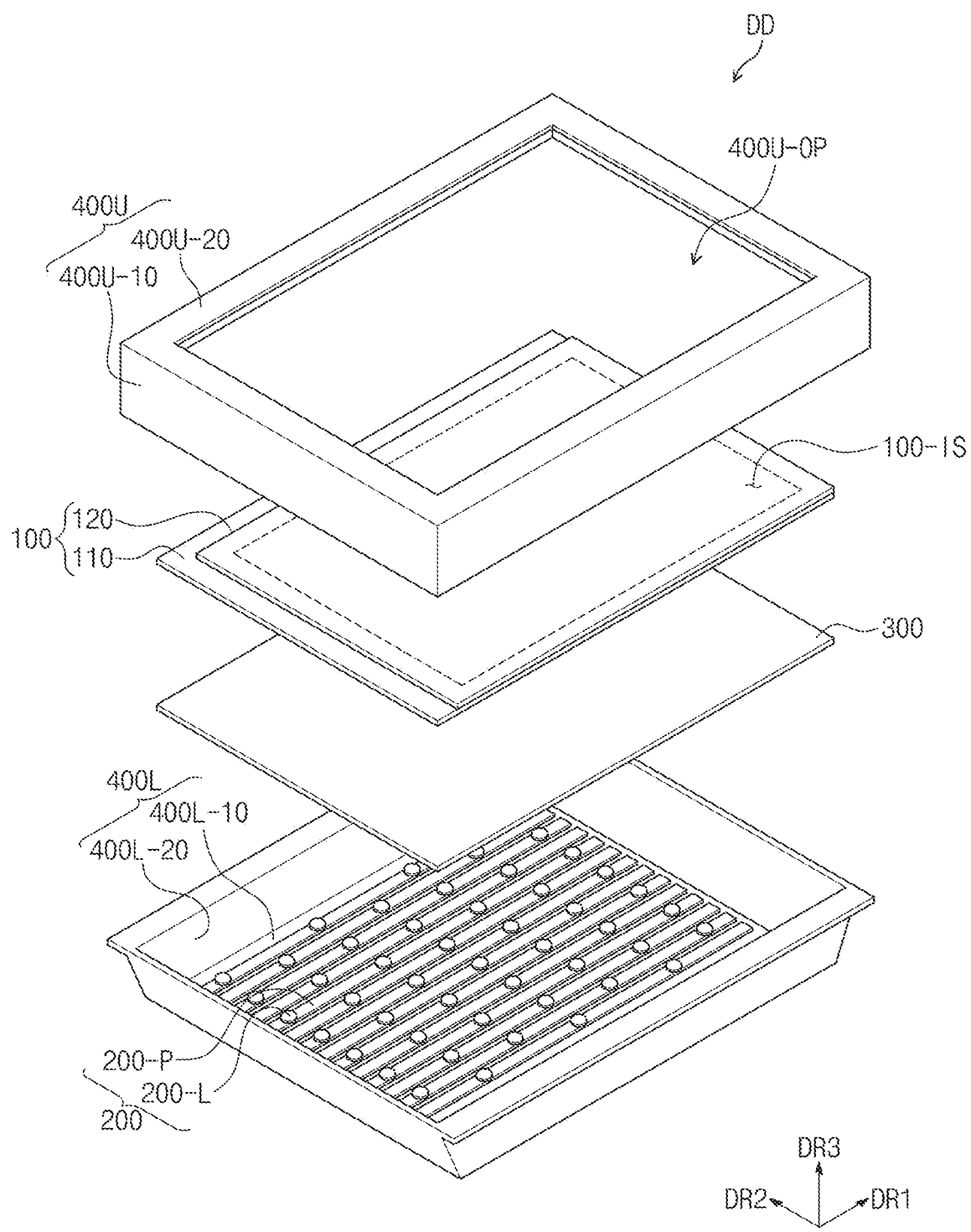
FIG. 1 is an exploded perspective view of a display device according to an exemplary embodiment.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is an exploded perspective view of a display device DD according to an exemplary embodiment of the inventive concept. As illustrated in FIG. 1, a display device DD according to an exemplary embodiment of the inventive concept includes a display panel 100, light emitting units 200, an optical member 300, and protection members 400L and 400U.

The display panel 100 receives light from the light emitting units 200 and displays an image. The display panel 100 is not particularly limited and may include a transmissive display panel or a transflective display panel, such as a liquid crystal display panel, an electrophoretic display panel, and an electrowetting display panel.

The display panel 100 may display an image via a display surface 100-IS. The display surface 100-IS is parallel to a plane defined by a first direction axis DR1 and a second direction axis DR2. A normal direction of the display surface 100-IS, that is, a thickness direction of the display panel 100 is indicated by a third direction axis DR3.

A front surface (or a top surface) and a back surface (or a bottom surface) of each member or unit described below are defined according to the third direction axis DR3. However, the first to third direction axes DR1, DR2, and DR3 illustrated in FIG. 1 are merely exemplary directions. Hereinafter, the first to third directions are defined as the directions indicated by the first to third direction axes DR1, DR2 and DR3, respectively, and refer to the same reference numerals.

Although a flat display panel 100 is illustrated in this exemplary embodiment, the display panel 100 may have a curved display surface in other exemplary embodiments of the inventive concept. A shape of the display panel 100 is not particularly limited.

In this exemplary embodiment, the display panel 100 is a liquid crystal display panel. The liquid crystal display panel includes a first substrate 110, a second substrate 120 facing the first substrate 110, and a liquid crystal layer (not illustrated) disposed between the first substrate 110 and the second substrate 120. The liquid crystal display panel may be divided into a display area and a border area surrounding the display area. The display area is an area in which an image is displayed in a plan view, and the border area is an area in which an image is not displayed in a plan view while adjacent to the display area. The liquid crystal display panel includes a plurality of pixels disposed in the display area.

A pixel circuit composed of a signal line and pixels is disposed on any one of the first substrate 110 and the second substrate 120 (hereinafter, an array substrate). The array substrate may be connected to a main circuit substrate via such as a chip-on-film (COF). A central control circuit for driving the display panel 100 is disposed on the main circuit substrate. The central control circuit may be a microprocessor. The chip of the COF may be a data driving circuit. A gate driving circuit may be mounted on the array substrate or may be integrated on the array substrate in a low temperature poly-silicone (LTPS) form.

The central control circuit may control the light emitting units 200. A control signal for controlling the light emitting units 200 may be transmitted to a dimming circuit for the light emitting units 200.

The light emitting units 200 are disposed below the display panel 100 and the optical member 300. The light emitting units 200 generate a first color light. The first color light may include a wavelength of 410 nm to 480 nm. The peak wavelength of the first color light may be located in a range of 440 nm to 460 nm. The first color light may be a typical blue light.

Each of the light emitting units 200 includes a plurality of light emitting elements 200-L composing a point light source and a circuit substrate 200-P providing an electric signal to the light emitting elements 200-L. Each of the plurality of light emitting elements 200-L may be composed of a light emitting diode. Each of the light emitting units 200 may include a different number of light-emitting elements 200-L.

Although not illustrated separately, the display device DD may further include a circuit substrate for electrically connecting the light emitting units 200. The dimming circuit may be disposed on the circuit substrate. The dimming circuit dims the light emitting units 200 based on the control signal received from the central control circuit. The plurality of light emitting elements 200-L may be simultaneously turned on or off, or may be turned on and off independently.

The optical member 300 is disposed below the display panel 100 and above the light emitting units 200. The optical member 300 receives the first color light from the light emitting units 200. The optical member 300 partially transmits the first color light, and converts the first color light into a second color light and a third color light.

The second color light may include a wavelength of 500 nm to 570 nm. The third color light may include a wavelength of 580 nm to 675 nm. The peak wavelength of the second color light may be located in a range of 515 nm to 545 nm. The second color light may be a typical green light. The peak wavelength of the third color light may be located in a range of 610 nm to 645 nm. The third color light may be a typical red light.

The protection members 400L and 400U include a first protection member 400L disposed below the light emitting units 200 and a second protection member 400U disposed above the display panel 100. The first protection member 400L and the second protection member 400U are coupled to each other to accommodate the display panel 100, the light emitting units 200, and the optical member 300. The first protection member 400L and the second protection member 400U may be made of a metal or a plastic. The protection members 400L and 400U may further include a mold member (not illustrated).

The first protection member 400L accommodates the light emitting units 200. The first protection member 400L includes a bottom portion 400L-10 and a plurality of side wall portions 400L-20 bent and extended from edges of the bottom portion 400L-10. The bottom portion 400L-10 may have a rectangular shape and the first protection member 400L may include four side wall portions 400L-20. The shape of the first protection member 400L is not particularly limited. The number of the side wall portions 400L-20 may be changed and steps may be formed on the bottom portion 400L-10 and the side wall portions 400L-20.

The light emitting units 200 are mounted on the bottom portion 400L-10. The light emitting units 200, specifically the circuit substrates 200-P, may completely cover the bottom portions 400L-10. The circuit substrates 200-P may cover more than 90% of the bottom portions 400L-10.

The second protection member 400U is disposed above the display panel 100 to cover the edge area of the display panel 100. The second protection member 400U is provided with an opening 400U-OP through which an image is passed. The opening 400U-OP corresponds to the display area of the display panel 100.

The second protection member 400U may have a rectangular frame in a plan view. The second protection member 400U may be divided into four parts. The four parts may have an integral shape or may be assembled. Each of the four parts includes a side wall portion 400U-10 and a front portion 400U-20 bent from the side wall portion 400U-10. The front portions 400U-20 of the four parts substantially define the opening 400U-OP. In an exemplary embodiment, the front portion 400U-20 may be omitted.

Figure 2A:
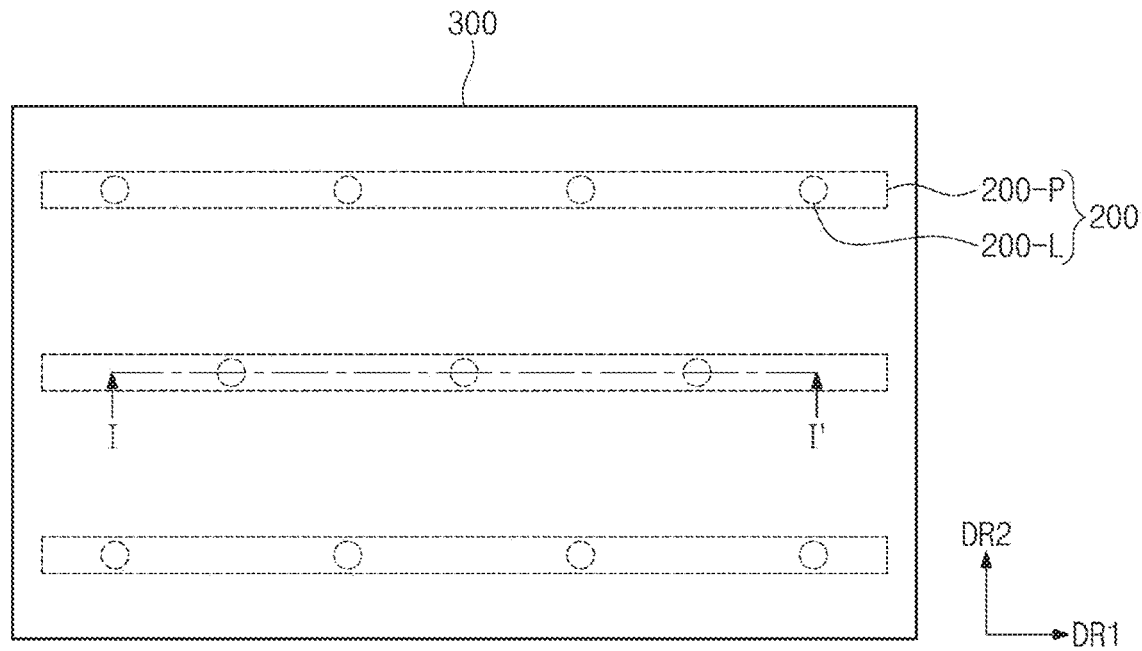
FIG. 2A is a plan view illustrating a portion of a display device according to an exemplary embodiment.
Figure 2B:
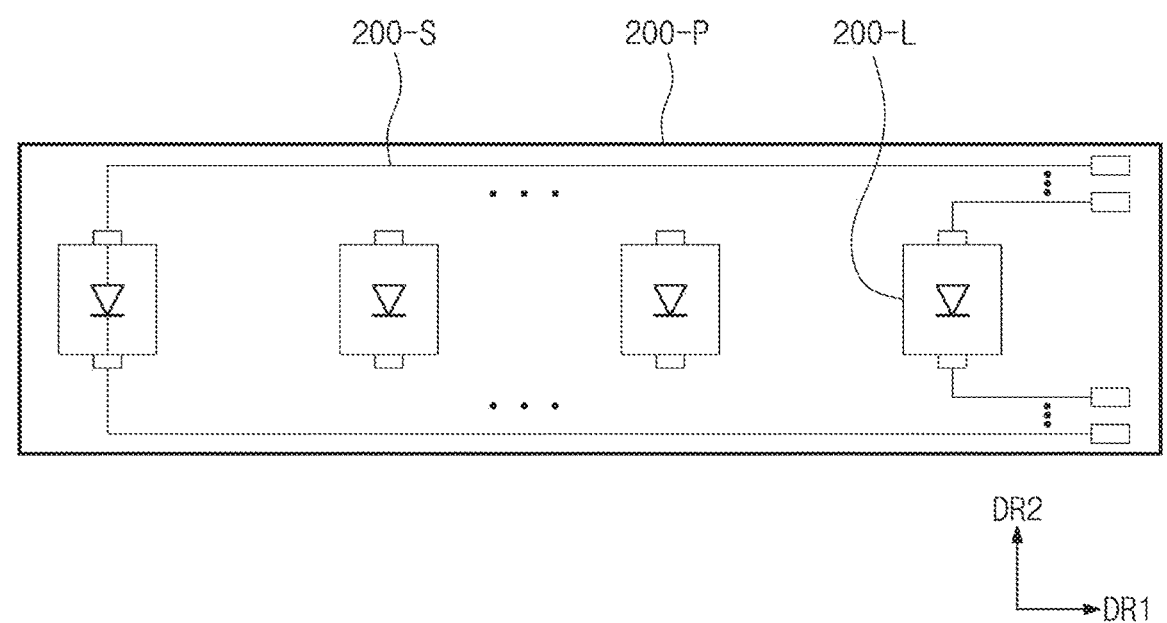
FIG. 2B is an equivalent circuit diagram of a light emitting unit according to an exemplary embodiment.
Figure 2C:
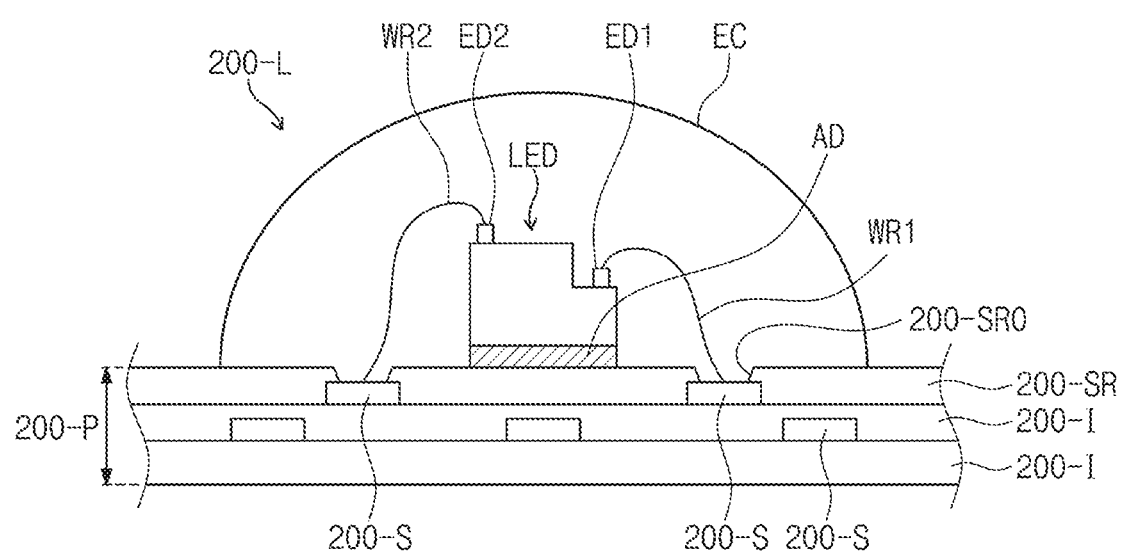
FIG. 2C is a cross-sectional view of a light emitting unit according to an exemplary embodiment.
Figure 2D:
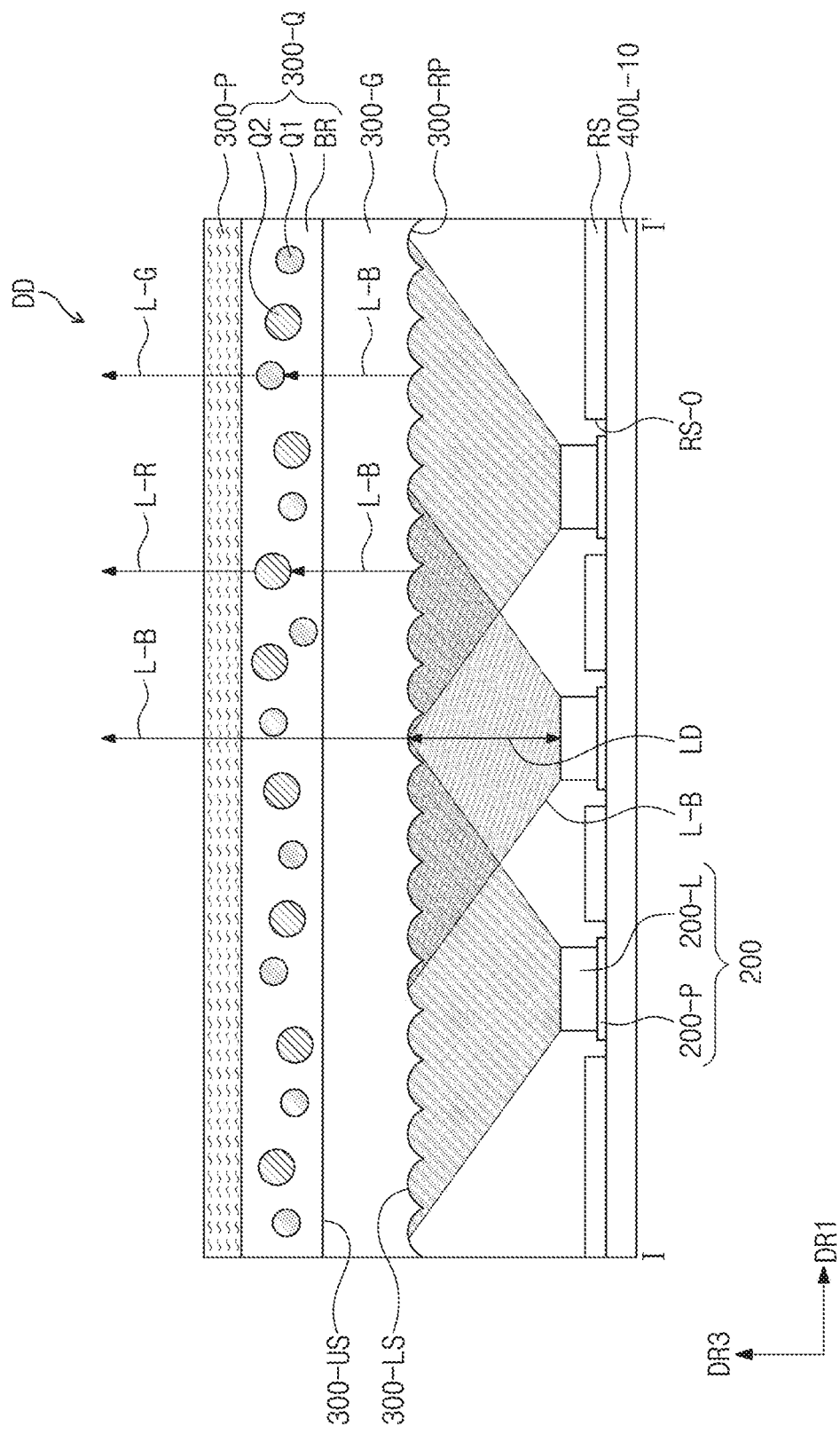
FIG. 2D is a cross-sectional view illustrating a portion of a display device according to an exemplary embodiment.
Figure 3:
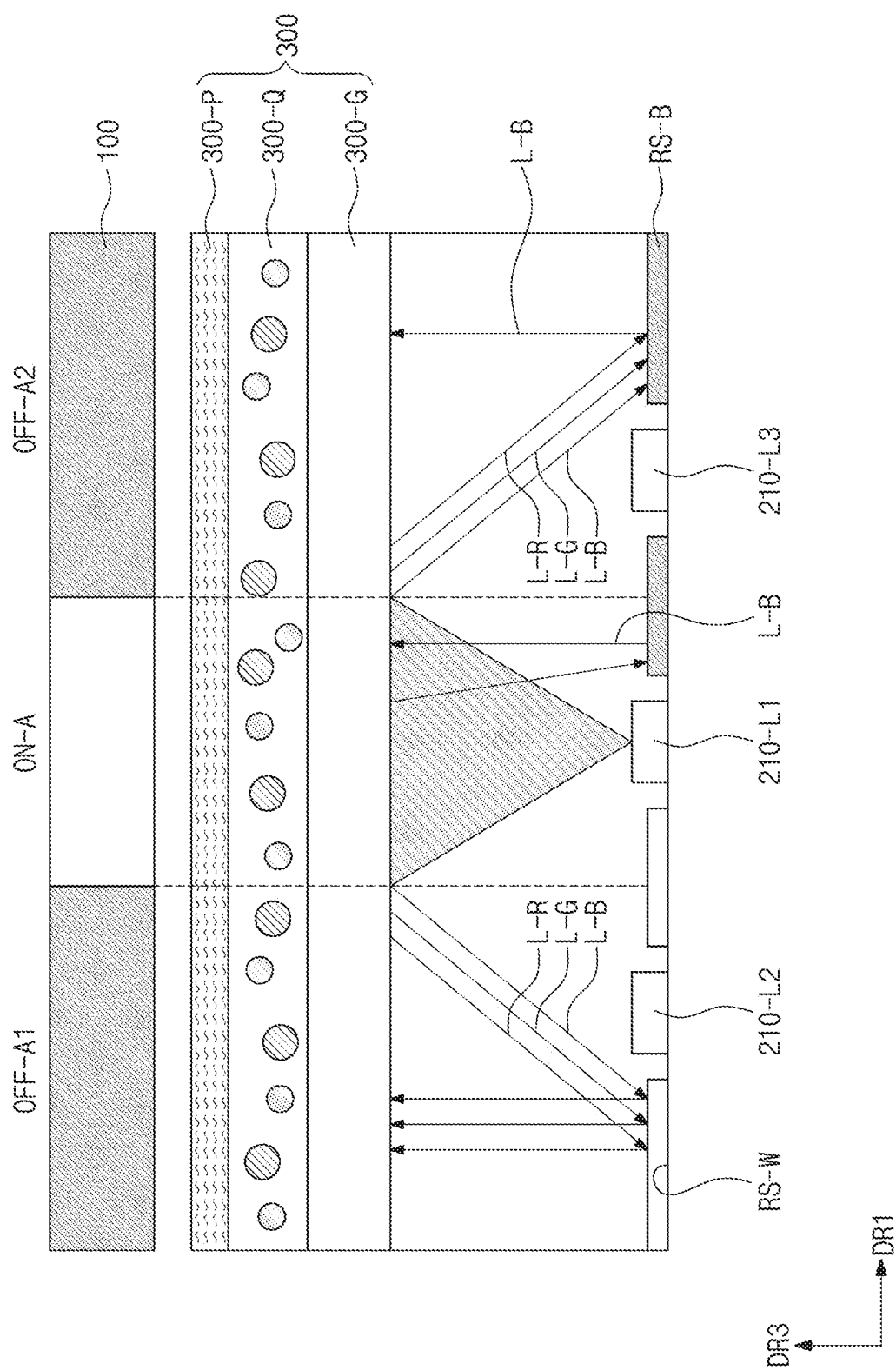
FIG. 3 is a cross-sectional view of a display device for explaining an effect of a reflection sheet according to an exemplary embodiment.

FIG. 2A is a plan view illustrating a portion of a display device DD according to an exemplary embodiment of the present invention. FIG. 2B is an equivalent circuit diagram of light emitting units 200 according to an exemplary embodiment of the present invention. FIG. 2C is a cross-sectional view of light emitting units 200 according to an exemplary embodiment of the present invention. FIG. 2D is a cross-sectional view illustrating a portion of a display device DD according to exemplary embodiment of the present invention. FIG. 3 is a cross-sectional view of a display device for explaining an effect of a reflection sheet RS according to exemplary embodiment of the present invention.

As illustrated in FIGS. 2A to 2D, each of the light emitting units 200 includes light emitting elements 200-L and circuit substrates 200-P. In FIG. 2A, some parts of the light emitting units 200 are not illustrated. As illustrated in FIG. 2B, the light emitting elements 200-L are connected to each of signal lines 200-S for dimming. As illustrated in FIGS. 2A and 2B, the circuit substrates 200-P have a shape extended in the first direction DR1.

As illustrated in FIG. 2C, the circuit substrate 200-P includes at least one insulation layer 200-I and at least one circuit layer 200-S. In FIG. 2C, a multi-layered circuit substrate 200-P, in which two insulation layers 200-I and two circuit layers 200-S are alternately stacked, is exemplary illustrated. The circuit layers 200-S may include a plurality of conductive patterns, and the conductive patterns may include the signal lines 200-S in FIG. 2C.

The uppermost circuit layer 200-S of the two circuit layers 200-S is covered by a protection layer 200-SR. The protection layer 200-SR provides an outer surface of the circuit substrate 200-P. The uppermost circuit layer 200-S includes connection terminals connected to the signal line 200-S. The protection layer 200-SR includes openings 200-SRO for exposing the connection terminals.

The light emitting elements 200-L may include a light emitting diode (LED). The light emitting diode (LED) generates light in response to a driving voltage applied via a first electrode ED1 and a second electrode ED2. The light emitting diode (LED) may have a structure in which an n-type semiconductor layer, an active layer, and a p-type semiconductor layer are sequentially stacked.

The first electrode ED1 is connected to one of the connection terminals, and the second electrode ED2 is connected to another of the connection terminals. The first electrode ED1 and the second electrode ED2 may be respectively connected to the connection terminals by wires WR1 and WR2. The light emitting diode (LED) may be attached on the protection layer 200-SR by an adhesive member AD.

The light emitting elements 200-L may further include an encapsulation member EC for protecting the light emitting diode (LED). The encapsulation member EC prevents the wires WR1 and WR2 from being disconnected or oxidized. The encapsulation member EC may include a resin material, such as an epoxy resin.

As illustrated in FIG. 2D, an optical member 300 includes a glass substrate 300-G, a quantum dot layer 300-Q, and a protection layer 300-P.

The glass substrate 300-G supports functional layers of the optical member 300. A thickness of the glass substrate 300-G may be 0.3 mm to 1 mm. Even if an optical distance LD between the light emitting elements 200-L and the glass substrate 300-G is short, defects rarely occur because less thermal deformation of the glass substrate 300-G occurs. The optical distance LD may be 2 mm to 15 mm.

Concave patterns 300-RP dented toward the thickness direction may be defined on the lower surface 300-LS of the glass substrate 300-G. The concave patterns 300-RP may havein a lens shape, but the shapes are not limited thereto. A size of the concave patterns 300-RP may be irregular. The concave patterns 300-RP may diffuse the first color light L-B received from the light emitting units 200. The lens patterns 300-RP may be formed by mechanical etching, chemical etching, etc.

The quantum dot layer 300-Q is "directly disposed" on the upper surface 300-US of the glass substrate 300-G. "An A layer is directly disposed on a B layer" herein means that an adhesive layer is not disposed between the A layer and the B layer, but contact or non-contact between the A layer and the B layer is not limited. In the exemplary embodiment, the quantum dot layer 300-Q is formed by coating or printing on the glass substrate 300-G instead of attaching a separately prepared sheet. The thickness of the optical member 300 is reduced and manufacturing cost is reduced because the separately prepared quantum dot sheet is not used.

The quantum dot layer 300-Q may include a base resin BR and quantum dots Q1 and Q2 mixed (or dispersed) in the base resin BR. The base resin BR is a medium in which the quantum dots Q1 and Q2 are dispersed, and may be composed of various resin compositions generally referred to as a binder. However, the inventive concepts is not limited thereto, and any medium capable of dispersing the quantum dots Q1 and Q2 herein may be referred to as a base resin BR regardless of the name, additional other functions or constituent materials, etc. The base resin BR may be a polymer resin. For example, the base resin BR may be an acrylic-based resin, a urethane-based resin, a silicone-based resin or an epoxy-based resin, etc. The base resin BR may be a transparent resin.

Although not illustrated separately, the quantum dot layer 300-Q may further include barrier layers disposed to contact the upper and lower surfaces of the base resin layer BR. The barrier layers may be inorganic layers and seal the base resin layer BR.

The quantum dots Q1 and Q2 may be particles that change a wavelength of light provided in a light source member LM (FIG. 1). The quantum dots Q1 and Q2 have a crystal structure size in several nanometers, and are composed of hundreds to thousands of atoms, and exhibit a quantum confinement effect in which an energy band gap becomes larger due to the small sizes thereof. When light with a wavelength having a higher energy than the band gap energy is incident on the quantum dots Q1 and Q2, the quantum dots Q1 and Q2 absorb the light to become excited and fall to a ground state while emit light with a specific wavelength. The light with the emitted wavelength has an energy corresponding to the band gap. Luminescence characteristics of the quantum dots Q1 and Q2 by the quantum confinement effect may be adjusted provided that the size and composition thereof are adjusted.

The quantum dots Q1 and Q2 may be selected from a Group II-VI compound, a Group III-V compound, a Group IV-VI compound, a Group IV element, a Group IV compound, and a combination thereof.

The Group II-VI compound may be selected from the group consisting of: a binary element compound selected from the group consisting of CdSe, CdTe, ZnS, ZnSe, ZnTe, ZnO, HgS, HgSe, HgTe, MgSe, MgS, and a combination thereof; a ternary element compound selected from the group consisting of AgInS, CuInS, CdSeS, CdSeTe, CdالسTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof; and a quaternary element compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and a combination thereof.

The Group III-V compound may be selected from the group consisting of: a binary element compound selected from the group consisting of GaN, GaP, GaAs, GaSb, AlN, AlP, AlAs, AlSb, InN, InP, InAs, InSb, and a combination thereof; a ternary element compound selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a combination thereof; and a quaternary element compound selected from the group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof.

The Group IV-VI compound may be selected from the group consisting of: a binary element compound selected from the group consisting of SnS, SnSe, SnTe, PbS, PbSe, PbTe, and a combination thereof; a ternary element compound selected from the group consisting of SnSeS, SnSeTe, SnSTe, PbSeS, PbSeTe, PbSTe, SnPbS, SnPbSe, SnPbTe, and a combination thereof; and a quaternary element compound selected from the group consisting of SnPbSSe, SnPbSeTe, SnPbSTe, and a combination thereof.

The Group IV element may be selected from the group consisting of Si, Ge, and a combination thereof.

The Group IV compound may be a binary element compound selected from the group consisting of SiC, SiGe, and a combination thereof.

Here, the binary element compounds, the ternary element compounds, or the quaternary element compounds may exists in the particle at a uniform concentration. The binary element compounds, the ternary element compounds, and the quaternary element compounds exist in the particle in a state in which concentration distribution is divided into partially different states.

The quantum dots Q1 and Q2 may be a core/shell structure including a core and a shell surrounding the core. Alternatively, the quantum dots Q1 and Q2 may have another core/shell structure in which one quantum dot surrounds the other quantum dot. The interface between the core and the shell may have a concentration gradient in which the concentration of the elements present in the shell becomes lower toward the center of the particle.

The quantum dots Q1 and Q2 may be particles having a nanometer-scale size. The emission wavelength spectrum of the quantum dots Q1 and Q2 may have a "full width of half maximum" (FWHM) of about 45 nm or less, preferably about 40 nm or less, more preferably about 30 nm or less, and thus, color purity or color reproducibility may be improved in the above range. In addition, the light emitted via the quantum dots Q1 and Q2 is emitted in all directions, so that a viewing angle of the light may be improved.

Furthermore, a shape of the quantum dots Q1 and Q2 is not limited to the specific shape typically used in the art, but more specifically, a nano-particle, a nano-tube, a nano-wire, a nano-fiber or a nano-plate particle, etc. having a spherical shape, a pyramidal shape, a multi-arm shape, or a cubic shape may be used.

In an exemplary embodiment, the quantum dot layer 300-Q may include the plurality of quantum dots Q1 and Q2 which convert the incident light into colors each having different wavelength bands. The plurality of quantum dots Q1 and Q2 may include first quantum dots Q1 for converting the first color light L-B into a second color light L-G and second quantum dots Q2 for converting the optical member 300 into a third color light L-R. The first color light L-B, the second color light L-G, and the third color light L-R emitted from the quantum dot layer 300-Q may be provided to the display panel 100 (see FIG. 1) as white light.

The protection layer 300-P may be deposited or coated on the quantum dot layer 300-Q to contact the quantum dot layer 300-Q. The protection layer 300-P may include an organic layer and/or an inorganic layer. In an exemplary embodiment of the inventive concept, the protection layer 300-P may be omitted.

According to the exemplary embodiment, since the direct-type light emitting units 200 provide the white light to the display panel 100 (see FIG. 1) using the quantum dot layer 300-Q, the display panel 100 may provide an image having a high luminance.

According to the exemplary embodiment, the display device DD may further include the reflection sheet RS. The reflection sheet RS is disposed on the plurality of light emitting units 200 and defines a plurality of openings RS-O corresponding to the light emitting elements 200-L.

The reflection sheet RS may have a color reflecting the first color light. That is, the reflection sheet RS may have a blue color reflecting blue light. The reflection sheet RS may include a resin layer and an organic layer of blue color disposed on the resin layer. The organic layer may absorb green light and red light.

FIG. 3 illustrates a plurality of display areas ON-A, OFF-A1 and OFF-A2 of the display device capable of a dimming operation. FIG. 3 illustrates first to a third light emitting elements 200-L1, 200-L2, and 200-L3, and first to a third display areas ON-A, OFF-A1, and OFF-A2 corresponding thereto. The first to the third display areas ON-A, OFF-A1, and OFF-A2 are partial areas of the display panel 10 (see FIG. 1). A reflection sheet RS-W having a white or a silver color is disposed on a periphery of the second light emitting element 200-L2, and a reflection sheet RS-B having a blue color is disposed on a periphery of the third light emitting element 200-L3.

The first display area ON-A displays an image using the light generated from the first light emitting element 200-L turned on. At this time, the second and the third display areas OFF-A1 and OFF-A2 display a black image, and for this purpose, the second and the third light emitting elements 200-L2 and 200-L3 corresponding to the second and the third display areas OFF-A1 and OFF-A2 may be turned off.

The light reflected from the optical member 300 among the first color light L-B generated from the first light emitting element 200-L may be reflected from the reflection sheet RS-B having a blue color and may be incident on the optical member 300 again, thereby improving the light efficiency.

The second and the third color lights L-G and L-R (hereinafter, referred to as leakage lights), which are directed to the reflection sheet RS after being generated from the optical member 300, may be reflected from the reflection sheet RS-W having a white or silver color and may be incident on the second display area OFF-A1. The leakage lights L-G and L-R may be absorbed on the reflection sheet RS-B having a blue color. The yellow halo (or light ring) phenomenon occurring around the turn-on area is reduced by preventing the leakage light from being incident on the turned-off area by the reflection sheet RS-B.

In an exemplary embodiment of the inventive concept, the reflection sheet RS illustrated in FIG. 2D may be omitted. In an exemplary embodiment of the inventive concept, the protection layer 200-SR described with reference to FIG. 2C may have a blue color. The protection layer 200-SR may be an organic layer including a dye or pigment having a blue color. The protection layer 200-SR may have the same function as the reflection sheet. The circuit substrates 200-P may substantially completely cover the bottom portions 400L-10 to more effectively achieve the light efficiency improvement using the circuit substrate 200-P. The disposition relationship between the circuit substrates 200-P and the bottom portion 400L-10 has been described above with reference to FIG. 1.

Figure 4A:
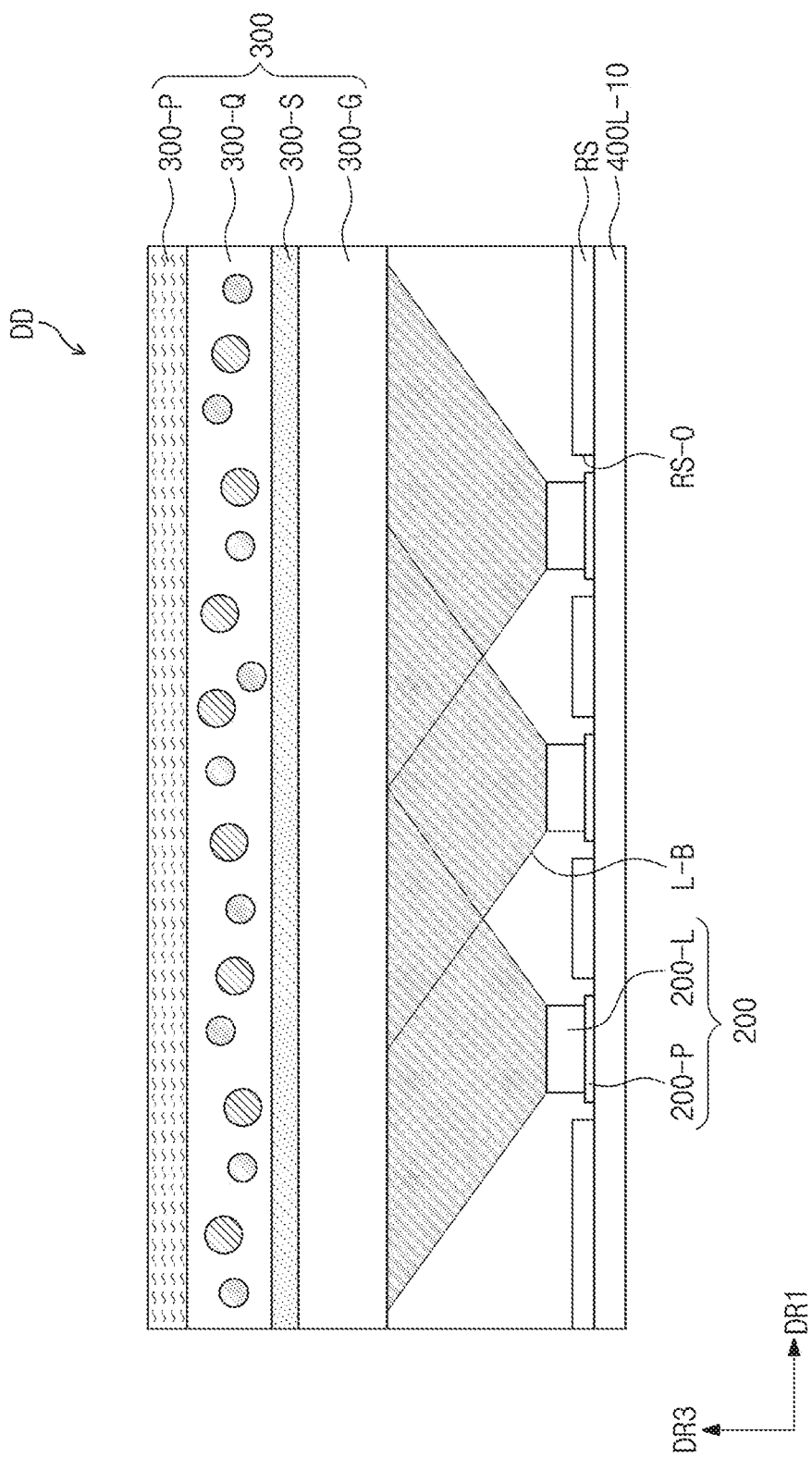
FIG. 4A is a cross-sectional view illustrating a portion of a display device according to an exemplary embodiment.
Figure 4B:
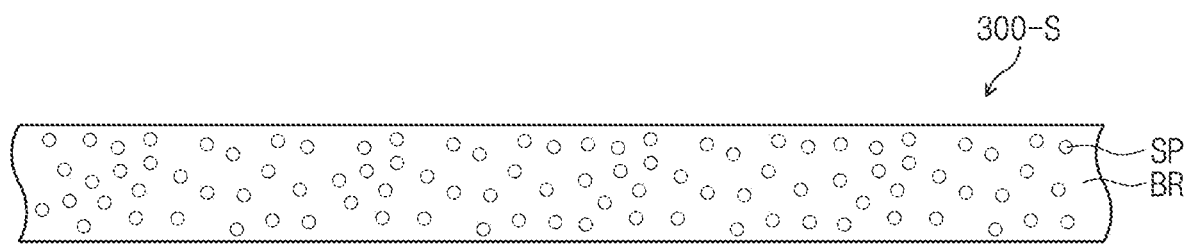
FIG. 4B is a cross-sectional view illustrating a scattering layer according to an exemplary embodiment.

FIG. 4A is a cross-sectional view illustrating a portion of a display device DD according to an exemplary embodiment of the present invention. FIG. 4B is a cross-sectional view illustrating a scattering layer 300-S according to an exemplary embodiment of the present invention. Hereinafter, a detailed description of the same configuration as that described with reference to FIGS. 1 to 3 will be omitted.

As illustrated in FIG. 4A, the scattering layer 300-S is directly disposed on the upper surface 300-US of the glass substrate 300-G. The scattering layer 300-S may be formed by a method of coating or printing. In the exemplary embodiment, the scattering layer 300-S is disposed between the glass substrate 300-G and the quantum dot layer 300-Q. The scattering layer 300-S may prevent a hot spot phenomenon by scattering the first color light L-B passing through the glass substrate 300-G. The hot spot phenomenon is a phenomenon in which a light amount concentrates only in a portion of the display panel 100 overlapped with the light emitting element 200-L.

The scattering layer 300-S may include a base resin BR and scattering particles SP mixed (or dispersed) in the base resin BR, as shown in FIG. 4B. The base resin BR is a medium in which the scattering particles SP are dispersed, and may be composed of various resin compositions generally referred to as a binder. However, the inventive concept is not limited thereto, and any medium capable of dispersing the scattering particles SP herein may be referred to as a base resin BR regardless of the name, additional other functions or constituent materials, etc. The base resin BR may be a polymer resin. For example, the base resin BR may be an acrylic-based resin, a urethane-based resin, a silicone-based resin or an epoxy-based resin, etc. The base resin BR may be a transparent resin.

As illustrated in FIG. 4B, the scattering particles SP may include at least one kind of particles. The scattering particles SP may have a refractive index of about 2 or more and may have a diameter of about 150 nm to 400 nm.

The scattering particles SP may include inorganic particles. The inorganic particles may be $TiO_2$, $SiO_2$, ZnO, $Al_2O_3$, $BaSO_4$, $CaCO_3$ or $ZrO_2$.

Figure 5A:
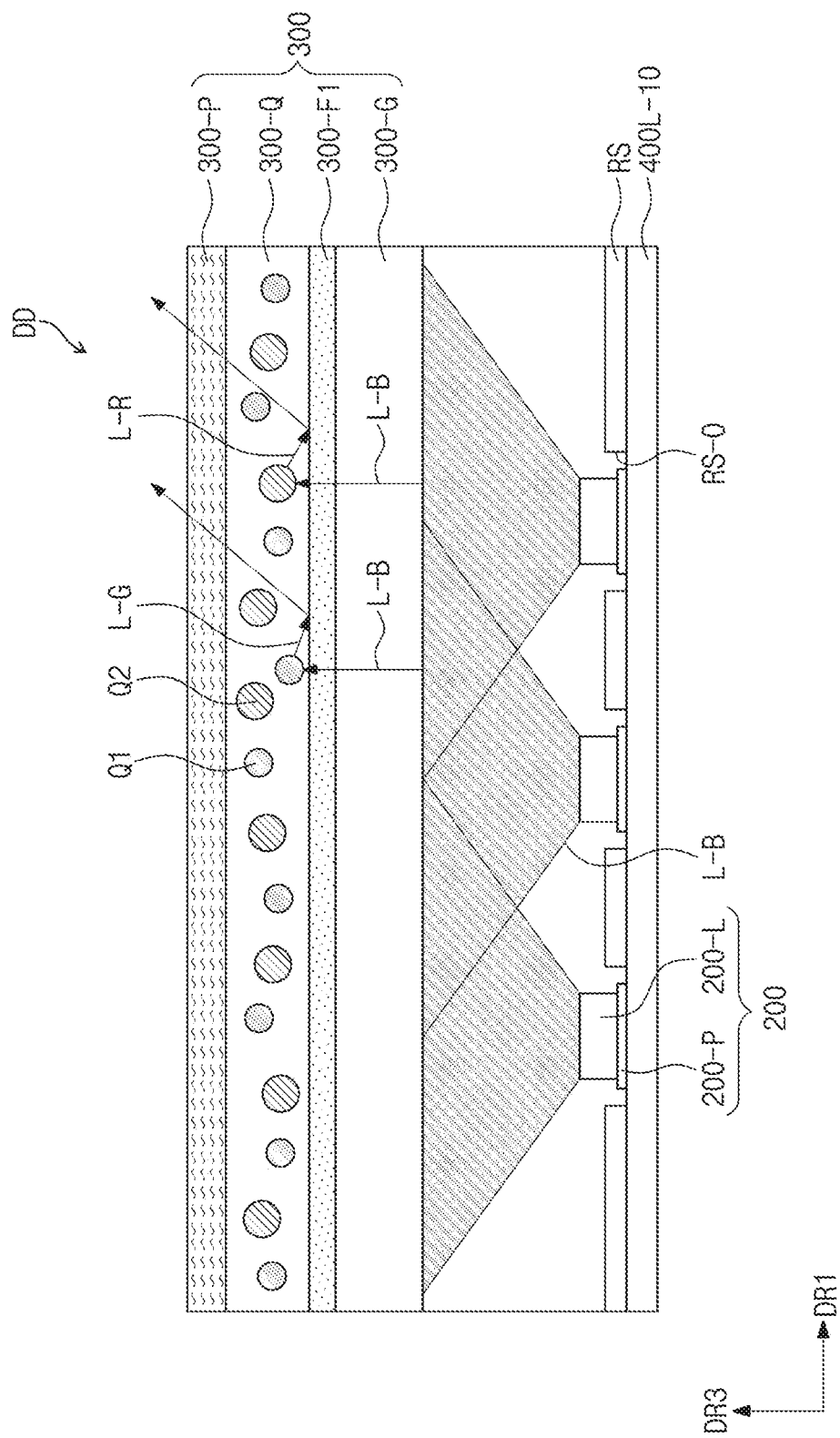
FIG. 5A is a cross-sectional view illustrating a portion of a display device according to an exemplary embodiment.
Figure 5B:
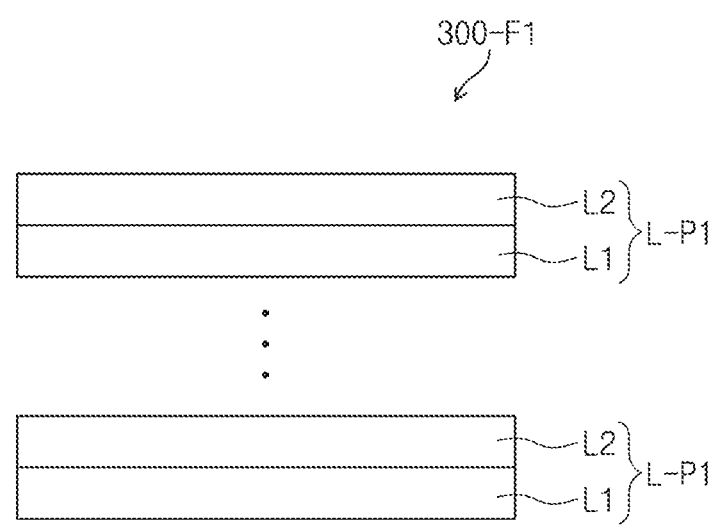
FIG. 5B is a cross-sectional view of a first filter according to an exemplary embodiment.
Figure 6A:
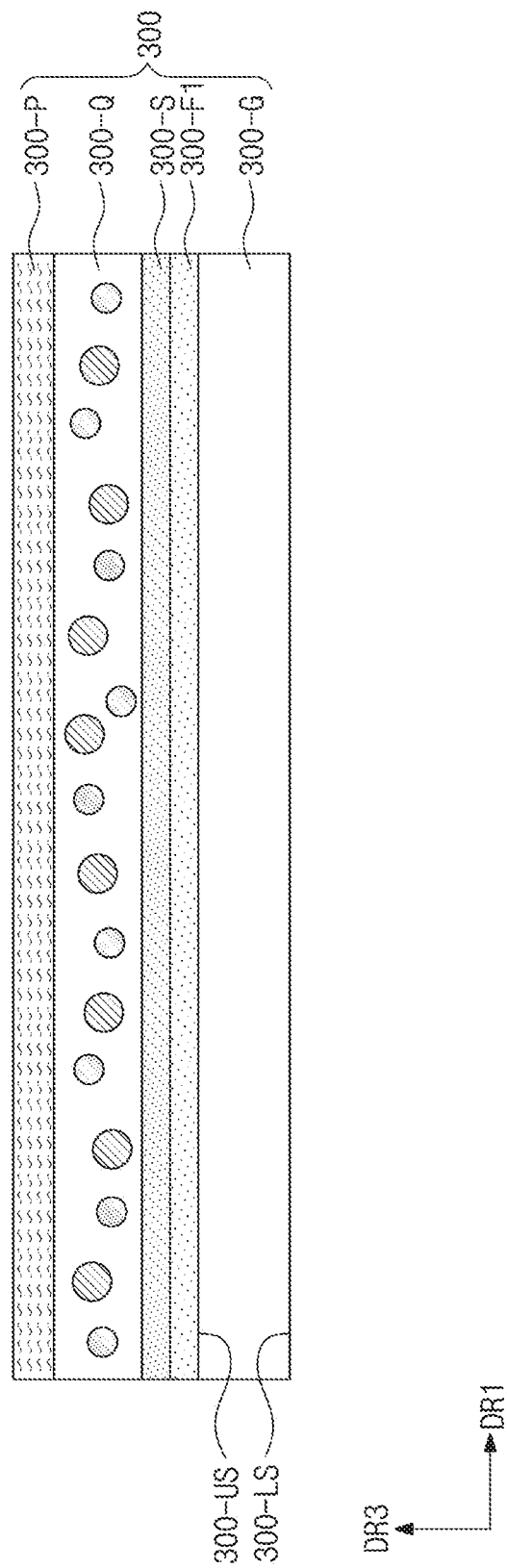
Figure 6D:
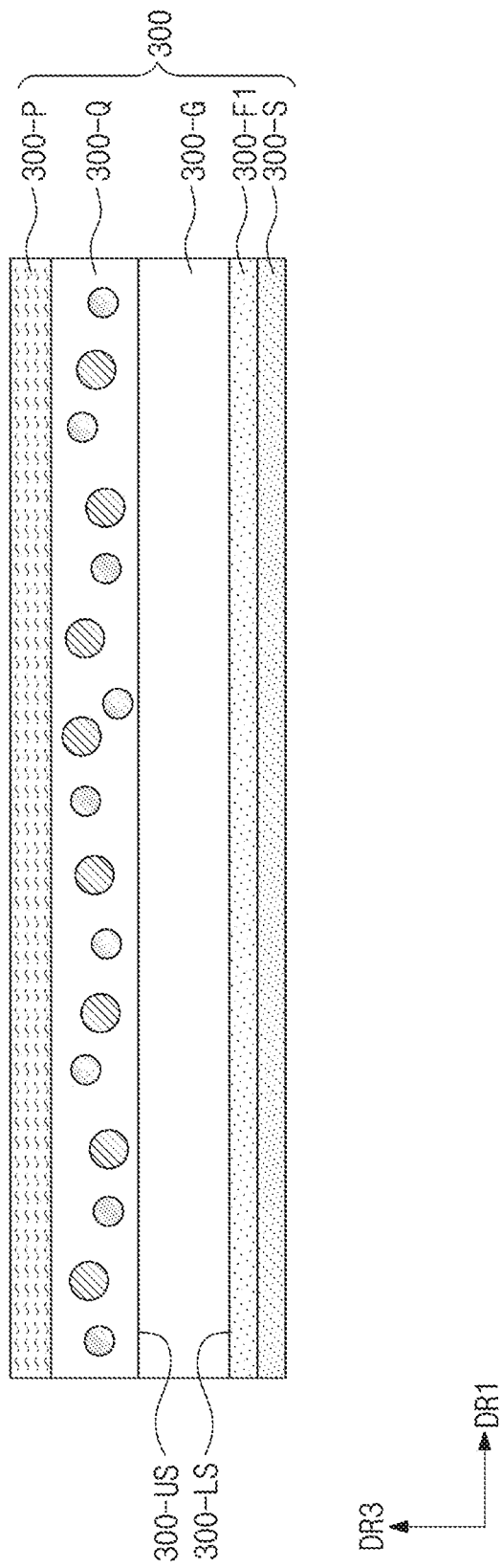

FIG. 5A is a cross-sectional view illustrating a portion of a display device DD according to an exemplary embodiment of the present invention. FIG. 5B is a cross-sectional view of a first filter 300-F1 according to an exemplary embodiment of the present invention. FIG. 5C is a cross-sectional view illustrating a portion of a display device according to an exemplary embodiment of the present invention. Hereinafter, detailed description of the same configuration as that described with reference to FIGS. 1 to 4B will be omitted.

As illustrated in FIG. 5A, the first filter 300-F1 is directly disposed on the upper surface 300-US of the glass substrate 300-G. The first filter 300-F1 may be formed by a method of coating or printing or deposition. In the embodiment, the first filter 300-F1 is disposed between the glass substrate 300-G and the quantum dot layer 300-Q.

The first filter 300-F1 transmits the first color light L-B and blocks the second color light L-G and the third color light L-R. The first filter 300-F1 transmits the light generated from the light emitting element 200-L and prevents the second color light L-G and the third color light L-R generated from the quantum dot layer 300-Q from being transmitted below the first filter 300-F1. Accordingly, the leakage light described with reference to FIG. 3 is reduced, and the contrast ratio may be improved. The first filter 300-F1 may reflect the second color light L-G and the third color light L-R, thereby improving the light efficiency.

The first filter 300-F1 has a function of a dichroic filter. A cut-off wavelength ($\lambda$Coff) of the first filter 300-F1 may be in a range of 500 nm<$\lambda$Coff<550 nm, where the cut-off wavelength ($\lambda$Coff) is defined as the wavelength at which the transmittance is 50% when the first filter 300-F1 is a short pass filter.

As illustrated in FIG. 5B, the first filter 300-F1 includes a plurality of first layers L1 and a plurality of second layers L2 which are alternately stacked. The refractive index of the plurality of first layers L1 may be about 1.4 to 1.6, and the refractive index of the plurality of second layers L2 may be about 1.9 to 2.1.

Each of the plurality of first layers L1 and the plurality of second layers L2 may include silicon oxide, silicon nitride or silicon oxynitride. Although including the same materials, the layers may respectively have different refractive indexes depending on the deposition conditions of the thin film. The first layer L1 and the second layer L2 which are consecutively stacked may be defined as a unit layer L-P1. The first filter 300-F1 may include about 6-15 unit layers L-P1.

As illustrated in FIG. 5C, the first filter 300-F1 may be disposed directly on the lower surface 300-LS of the glass substrate 300-G.

FIGS. 6A to 6E are cross-sectional views illustrating a portion of an optical member 300 according to an exemplary embodiment of the present invention. Hereinafter, detailed description of the same configuration as that described with reference to FIGS. 1 to 5D will be omitted.

As illustrated in FIGS. 6A to 6E, the optical member 300 includes a glass substrate 300-G, a first filter 300-F1, a scattering layer 300-S, a quantum dot layer 300-Q, and a protection layer 300-P. Passivation layers containing an organic or an inorganic material may be further disposed between the layers.

As illustrated in FIGS. 6A to 6E, a stacked order of the glass substrate 300-G, the first filter 300-F1, the scattering layer 300-S, and the quantum dot layer 300-Q may be variously changed. The first filter 300-F1, the scattering layer 300-S and the quantum dot layer 300-Q may be formed directly on an upper surface or a lower surface of the glass substrate 300-G through a continuous process.

Figure 7B:
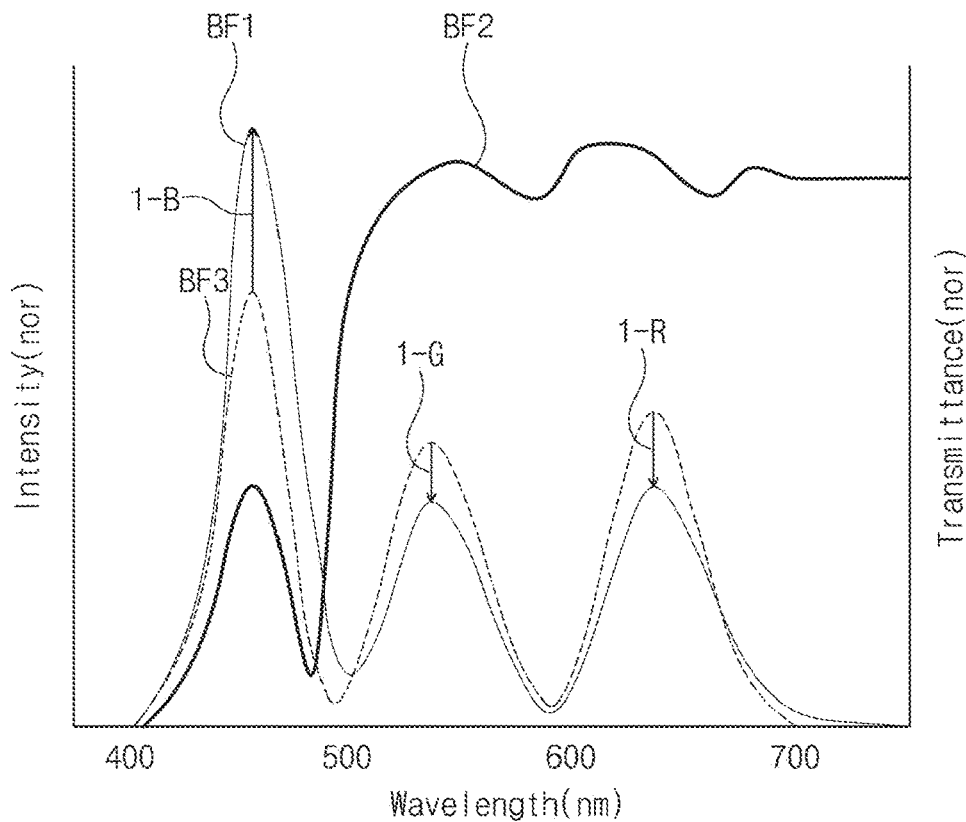
FIG. 7B is a graph showing spectra of lights generated from the display device and transmittance of a second filter according to an exemplary embodiment.
Figure 7C:
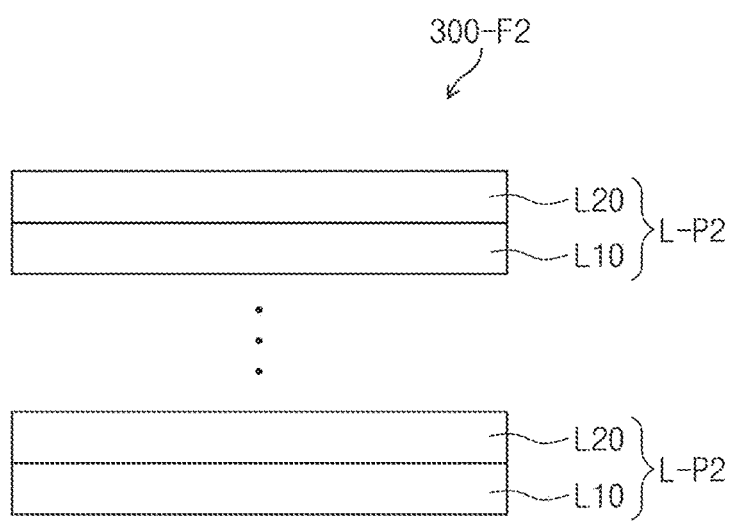
FIG. 7C is a cross-sectional view of a second filter according to an exemplary embodiment.

FIG. 7A is a cross-sectional view illustrating a portion of a display device DD according to an exemplary embodiment of the present invention. FIG. 7B is a graph showing spectra of lights generated from the display device DD and transmittance of a second filter according to an exemplary embodiment of the present invention. FIG. 7C is a cross-sectional view of the second filter 300-F2 according to an exemplary embodiment of the present invention. FIG. 7D is a cross-sectional view illustrating a portion of the display device DD according to an exemplary embodiment of the present invention. Hereinafter, detailed description of the same configuration as that described with reference to FIGS. 1 to 6E will be omitted.

As illustrated in FIG. 7A, the second filter 300-F2 is directly disposed on a quantum dot layer 300-Q. The second filter 300-F2 may be formed by a method of coating or printing or deposition.

The second filter 300-F2 has a function of a dichroic filter. A cut-on wavelength ($\lambda$Con) of the second filter 300-F2 may be in the range of 465 nm<$\lambda$Con<485 nm, where the cut-on wavelength ($\lambda$Con) is defined as the wavelength at which the transmittance is 50% when the second filter 300-F2 is a long pass filter.

The second filter 300-F2 lowers the transmittance of the first color light L-B. The first color light L-B reflected from the second filter 300-F2 is reflected to the quantum dot layer 300-Q, and accordingly, the luminance of the second color light L-G and the third color light L-R becomes high.

Referring to FIG. 7B, a first graph BF1 shows the light emission spectrum of the display device DD in which the second filter 300-F2 is omitted. A second graph BF2 shows the transmittance of the second filter 300-F2. A third graph BF3 shows the light emission spectrum of the display device DD in which the second filter 300-F2 is disposed.

It is confirmed that a light emission intensity of the first color light L-B is lowered by a first intensity I-B due to an effect of the second filter 300-F2, but a light emission intensity of the second color light L-G is increased by a second intensity I-G and a light emission intensity of the third color light L-R is increased by a third intensity I-R.

As a difference of the light emission intensities of the first color light L-B, the second color light L-G, and the third color light L-R emitted from the optical member 300 decreases, a white light with almost no discoloration may be provided to the display panel 100 (see FIG. 1).

Furthermore, in the third graph BF3 versus the first graph BF1, the light emission intensity of light having a wavelength of about 500 nm was reduced. In other words, the light emission spectrum of the first color light L-B and the second color light L-G became narrow. As a result, a color gamut of the image generated from the display panel 100 may become wide.

As illustrated in FIG. 7C, the second filter 300-F2 includes a plurality of first layers L10 and a plurality of second layers L20 which are alternately stacked. A refractive index of the plurality of first layers L10 may be about 1.4 to 1.6, and a refractive index of the plurality of second layers L20 may be about 1.9 to 2.1.

Each of the plurality of first layers L10 and the plurality of second layers L20 may include silicon oxide, silicon nitride, or silicon oxynitride. Although including the same materials, the layers may respectively have different refractive indexes depending on the deposition conditions of the thin film.

The first layer L10 and the second layer L20 which are consecutively stacked may be defined as a unit layer L-P2. The second filter 300-F2 may include about 1-5 unit layers L-P2. In the exemplary embodiment, the second filter 300-F2 disposed on the quantum dot layer 300-Q may have a function of a protection layer. Accordingly, the protection layer 300-P may be omitted.

As illustrated in FIG. 7D, a scattering layer 300-S may be further disposed on the second filter 300-F2. The scattering layer 300-S may be the same as that described with reference to FIGS. 4A and 4B. Since the second filter 300-F2 has the function of a dichroic filter, light passing through the second filter 300-F2 may be recognized by the user in different colors according to a viewing angle. The scattering layer 300-S may eliminate the above-mentioned characteristic of the light passing through the dichroic filter by scattering the light passing through the second filter 300-F2.

Although not illustrated separately, an optical member 300 further including the second filter 300-F2, and an optical member 300 further including the second filter 300-F2 and the scattering layer 300-S may be modified in a manner similar to the optical member 300 illustrated in FIGS. 6A to 6E. In the optical member 300 thus modified, the first filter 300-F1 may be omitted.

FIG. 8 is a cross-sectional view illustrating a portion of a display device DD according to an exemplary embodiment of the present invention. Hereinafter, detailed description of the same configuration as that described with reference to FIGS. 1 to 7D will be omitted.

As illustrated in FIG. 8, scattering patterns 300-SP may be defined on an upper surface 300-US of the glass substrate 300-G. The scattering patterns 300-SP may be irregularly disposed. The scattering patterns 300-SP may scatter the first color light L-B received from the light emitting units 200. The scattering patterns 300-SP may be formed by an etching process.

A passivation layer 300-PA contacting the scattering patterns 300-SP and providing a planar surface may be disposed on the upper surface 300-US of the glass substrate 300-G. The passivation layer 300-PA may include an organic material and may be formed by a coating.

According to the above-described, the glass substrate supports the functional layers of the optical member. Since the glass substrate has less thermal deformation, even though the optical distance between the light emitting elements and the glass substrate is short, the number of defects is reduced.

Since the direct-type light emitting units provide a white light to the display panel using the quantum dot layer, the display panel may provide an image having a high luminance.

Leakage light may be absorbed on the reflection sheet having a blue color. It is possible to prevent the leakage light reflected from the reflection sheet or the light converted from the leakage light from being supplied to the inactive display area in a dimming operation, whereby deterioration of the inactive display area may be prevented.

Although certain exemplary embodiments have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device, comprising:
an optical member;
a display panel disposed above the optical member;
a plurality of light emitting units disposed below the optical member and configured to provide a first color light to the optical member; and
a protection member accommodating the plurality of light emitting units, the optical member, and the display panel,
wherein:
the optical member comprises:
  a glass substrate having an upper surface and a lower surface facing each other in a thickness direction, and overlapping the plurality of light emitting units in a plan view; and
  a quantum dot layer disposed on one of the upper surface and the lower surface, and configured to convert the first color light into a second color light and a third color light;
no adhesive layer is disposed between the quantum dot layer and the one of the upper surface and the lower surface on which the quantum dot layer is disposed; and
lens-shaped concave patterns are defined on the lower surface of the glass substrate and dented toward the upper surface of the glass substrate.

2. The display device of claim 1, wherein the first color light has a wavelength of 410 nm to 480 nm.

3. The display device of claim 1, wherein scattering patterns are defined on the upper surface of the glass substrate.

4. The display device of claim 3, further comprising a passivation layer contacting the scattering patterns of the glass substrate and providing a planar surface.

5. The display device of claim 1, wherein each of the plurality of light emitting units comprises a circuit substrate and a plurality of light emitting elements mounted on the circuit substrate.

6. The display device of claim 5, further comprising a reflection sheet disposed on the plurality of light emitting units and defining a plurality of openings corresponding to the plurality of light emitting elements,
wherein the reflection sheet has a blue color.

7. The display device of claim 5, wherein the plurality of light emitting elements are independently turned on and off.

8. The display device of claim 5, wherein the circuit substrate comprises a protection layer defining an outer surface, and the protection layer has a blue color.

9. The display device of claim 8, wherein:
the protection member comprises a first protection member supporting the plurality of light emitting units and a second protection member coupled to the first protection member;
the first protection member comprises a bottom portion and a side wall portion; and
the circuit substrate completely covers the bottom portion.

10. The display device of claim 1, further comprising a second filter disposed on the upper surface of the glass substrate,
wherein:
the second filter is configured to block the first color light; and
no adhesive layer is disposed between the second filter and the upper surface of the glass substrate.

11. The display device of claim 10,
wherein:
the second filter comprises:
  a plurality of first layers; and a plurality of second layers alternately disposed with the plurality of first layers;

a refractive index of the plurality of first layers is 1.4 to 1.6;

a refractive index of the plurality of second layers is 1.9 to 2.1;

one of first layers and one of second layers which are consecutively stacked are defined as a unit layer; and the second filter includes 1 to 5 unit layers.

12. The display device of claim 11, further comprising a scattering layer disposed on the second, the scattering layer comprising a base resin layer and scattering particles mixed in the base resin layer, wherein no adhesive layer is disposed between the scattering layer and the second filter.

13. A display device, comprising:

an optical member, a display panel disposed above the optical member; and a plurality of light emitting units disposed below the optical member and configured to provide a first color light to the optical member, wherein the optical member comprises:

a glass substrate having an upper surface and a lower surface facing each other in a thickness direction, and overlapping the plurality of light emitting units in a plan view;

a quantum dot layer disposed on one of the upper surface and the lower surface, and configured to convert the first color light into a second color light and a third color light;

a short pass filter disposed between the quantum dot layer and the glass substrate, and having a cut-off wavelength of 500 nm to 550 nm; and a long pass filter disposed on the quantum dot layer, and having a cut-off wavelength of 465 nm to 485 nm, wherein:

no adhesive layer is disposed between the quantum dot layer and one of the upper surface and the lower surface; and no adhesive layer is disposed between the quantum dot layer and the long pass filter.

* * * * *